United States Patent
Workman

(10) Patent No.: US 9,417,119 B2
(45) Date of Patent: Aug. 16, 2016

(54) SYSTEM AND METHOD TO DETECT HIDDEN MATERIALS USING A MOBILE DEVICE

(71) Applicant: ABION LLC, Cocoa Beach, FL (US)

(72) Inventor: Michael George Workman, Cape Canaveral, FL (US)

(73) Assignee: ABION LLC, Cocoa Beach, FL (US)

( * ) Notice: Subject to any disclaimer, the term of this patent is extended or adjusted under 35 U.S.C. 154(b) by 0 days.

(21) Appl. No.: 13/908,908

(22) Filed: Jun. 3, 2013

(65) Prior Publication Data

US 2014/0355384 A1     Dec. 4, 2014

Related U.S. Application Data

(60) Provisional application No. 61/689,336, filed on Jun. 4, 2012.

(51) Int. Cl.
*G01S 15/00* (2006.01)
*G01H 1/00* (2006.01)

(52) U.S. Cl.
CPC ...................... *G01H 1/00* (2013.01)

(58) Field of Classification Search
None
See application file for complete search history.

(56) References Cited

U.S. PATENT DOCUMENTS

| | | | | |
|---|---|---|---|---|
| 2003/0221487 A1* | 12/2003 | Silvagi | ............. | G01M 1/02 73/462 |
| 2004/0000989 A1* | 1/2004 | Davis | ............. | 340/426.2 |
| 2004/0063444 A1* | 4/2004 | Tissot et al. | ............. | 455/466 |
| 2005/0066730 A1* | 3/2005 | Raichle | ............. | G01N 29/14 73/579 |
| 2006/0261941 A1* | 11/2006 | Drake et al. | ............. | 340/539.26 |
| 2007/0008183 A1* | 1/2007 | Levi | ............. | 340/937 |
| 2010/0161254 A1* | 6/2010 | Atlas | ............. | G01H 1/00 702/56 |
| 2013/0197864 A1* | 8/2013 | Cottrell | ............. | G01H 9/00 702/188 |
| 2013/0321621 A1* | 12/2013 | Menzel | ............. | G01V 3/08 348/142 |
| 2015/0300993 A1* | 10/2015 | Prest | ............. | G01N 29/12 148/508 |

* cited by examiner

*Primary Examiner* — Travis Hunnings
(74) *Attorney, Agent, or Firm* — MU Patents; Timothy Marc Shropshire; Garrett James O'Sullivan

(57) ABSTRACT

A Mobile Device to detect concealed items in an automobile by measuring vibration. The mathematical formula frequency of vibration uses the mass M which affects the vibration. As mass of solid surface changes, so does the vibration. If difference in the vibration is detected between the inspected vehicle and empty vehicle that is the Baseline Frequency, it may indicate concealed items. The Mobile Device contains components needed to implement this invention. An accelerometer. A vibrator or speaker. A touch screen display. A computer operating system. A computer database. A computer network connection to the internet using a wireless network. A sensor to provide the latitude and longitude location of the device during testing, through GPS, GLONASS, or NETWORK. The device also provides an electrical power source using the device battery, wall outlet electricity, or automobile charging cable connected to an automobile.

12 Claims, 5 Drawing Sheets

SYSTEM AND METHOD TO DETECT HIDDEN MATERIALS USING A MOBILE DEVICE

BACKGROUND OF THE INVENTION

Prior Art

The following is a tabulation of some prior art that presently appears relevant:

| Patent Number | U.S.A. patents Issue Date | Patentee |
|---|---|---|
| 5,068,883 | Nov. 26, 1991 | DeHaan, et al. |
| 8,428,217 | Apr. 23, 2013 | Peschmann |
| 8,054,203 | Nov. 8, 2011 | Breed, et al. |
| 5,449,864 | Sep. 12, 1995 | Beatty, et al. |

This invention provides a means to identify if there are concealed items in an automobile. Automobiles are often used for transporting illegal and contraband materials such as illegal drugs, cash from illegal activities, untaxed goods, counterfeit goods, and other contraband. Automobiles can also be used as weapons when explosive materials are hidden within them. This invention provides a means to identify if there are hidden materials within an automobile, and provides advantages over the prior art.

Several methods use radiation to examine a vehicle and determine if there are hidden materials. One system uses dual energy X-ray CT scanning to examine objects and determine what kinds of materials are within the objects, including objects that are vehicles. The disadvantages of this system is that the apparatus to generate the dual energy is large and not readily mobile, and requires considerable effort to move from one location to another. Also this system requires a large and significant source of electricity to power the dual energy X-ray generating devices that are used to examine the objects. The dual energy X-ray radiation also poses a health risk to persons who may be exposed to it, so that it cannot be used to examine a vehicle if there are persons within the vehicle.

Another method uses a first substructure and a second substructure and the vehicle must be positioned between the substructures, and then ultrasonic sound is used to examine the vehicle and determine if there are objects within the vehicle. The disadvantage of this method is that it requires two separate structures that the vehicle must be driven between and the substructures themselves are not readily mobile and easy to carry by a single person.

One method used to detect contraband uses Infrared Light to examine a vehicle and detect certain analytes of material, Analyte Detection with Infrared Light. The infrared light is tuned to excite certain kinds of particles so that it can be configured to detect certain materials, such as those contained within explosive substances. To examine an entire vehicle at one time, requires a large number of infrared light sources as part of a large apparatus. The method is not readily mobile. Also this method cannot be used to determine if there are materials hidden within the hollow cavities of an automobile, such as the hollow space within the door of an automobile, where infrared light cannot penetrate without dismantling the door.

Another method, Vehicle Security Inspection System, uses a large apparatus and a conveyer belt that the vehicle is driven upon and then the conveyer belt is used to ferry the automobile past sensors of different types to detect contraband within the automobile. The permanent installation version of this method is large and not readily moveable from one location to another. A conveyer belt large enough to transport and carry an entire automobile cannot be carried by a single person from one location to another.

One method, Motor Vehicle Screening Apparatus and Method, relies on large, heavy machines to weigh the vehicle and compare the weight of the vehicle to that of an empty vehicle of the same type, to determine if the vehicle has additional materials in it. This is a large machine not readily moveable and takes a significant amount of time to prepare and deploy. The method uses an apparatus that is not readily mobile, and cannot be moved from one location to another by a single person.

Also, all of these methods do not automatically come with a connection to the internet that allows the methods to retrieve and send data to a central computer server connected to the internet. A significant effort would be required to setup these methods to report the results of their deployment and usage to a central computer server connected to the internet. Most Mobile Devices contain at least one means of connecting to the internet, and many have multiple means to connect to the internet.

SUMMARY OF THE INVENTION

The object of this invention is to provide a device to determine if there are concealed items within an automobile, or vehicle. The term "Mobile Device" specifically refers to certain kinds of mobile telephones, known as "Smartphones", such as the Apple iPhone, Android Phone, Windows Phone, and Blackberry Phone. Also, the term Mobile Device is often used to refer to tablet computers such as the Apple iPad, Android Tablet Computer, and Windows Tablet Computer. Using the Google internet search engine with the term "Mobile Device" will show that the term "Mobile Device" is specifically used to refer to these kinds of devices. These devices contain all the components needed to implement this invention. A device that runs a computer operating system, and a custom software application that runs on and controls the Mobile Device.

By measuring the frequency of vibration with which a surface of the automobile vibrates, and comparing it to the frequency of vibration for that particular kind of automobile when it is empty of hidden materials, it can be determined if there are hidden materials within the automobile. The mass of an object affects the frequency of vibration, when an automobile has hidden materials within it, it adds mass to the automobile and causes the frequency of vibration of different surfaces of the automobile to change.

Many Mobile Devices contain all of the necessary components to implement this invention, A computer processor chip and memory chips that allow a computer operating system and software to run on the device. An accelerometer, an electronic device that measures vibration and motion. An electronic vibrator that causes the Mobile Device to vibrate. For devices that do not specifically have an electronic vibrator to vibrate the device, the speaker of the device that emits sounds can be used to vibrate the device as well. A computer operating system, that manages the components of the Mobile Device and allows for the development of custom software using a programming language such as Java, Objective C, Swift, C#, C++, or C. A computer database library that allows for the storage and retrieval of data using a software application. A touch screen display that allows the Mobile Device user to control the Mobile Device and software that runs on it. A Global Positioning System (GPS) sensor that allows the latitude and longitude location of the Mobile Device to be determined. Some Mobile Devices also use the GLONASS global location system to get latitude and longitude. A connection to the internet using the cellular communications network the Mobile Device uses, and/or a connection to the internet using a wireless internet router, known as WiFi. The means of connection to the internet can also provide the Latitude and Longitude location of the device through Google Maps, which tracks latitude and longitude of network routers and cellular towers. A battery that serves as the source of electricity for all of the components within the Mobile Device, and also the Mobile Device can be connected to a wall outlet source of electricity, and/or an automobile electricity source device charging cable.

The Mobile Device is small and lightweight, and can be transported by a single person without difficulty. It also has a battery that allows for the Mobile Device to be used for several hours when fully charged, without the need of being plugged in to a wall outlet source of electricity and/or other source of electricity such as an automobile.

This invention is implemented using the Mobile Device by the following steps (a) Data about the automobile being inspected is entered into the Mobile Device using the touch screen of the Mobile Device (b) a long side of the device is placed against the part of the automobile being inspected (c) User presses a button on the touch screen of the device that causes the device to vibrate and apply energy to the surface of the automobile, and cause that surface to vibrate (d) The accelerometer contained within the device measures the vibration (e) The custom device software compares the vibration frequency during the test of the automobile, the test frequency, to that of the vehicle when it is empty of concealed items, the baseline frequency of vibration. and determines if there is a significant difference, that may indicate concealed materials (f) A simple PASS or FAIL message is displayed to the user depending on the results of the comparison (g) The results of the test are stored by the application software in a computer database on the Mobile Device and reported by web service to the central internet server, where the deployment of this Device across a geographic area can be monitored from a central location.

DETAILED DESCRIPTION OF THE INVENTION

Figure 1:
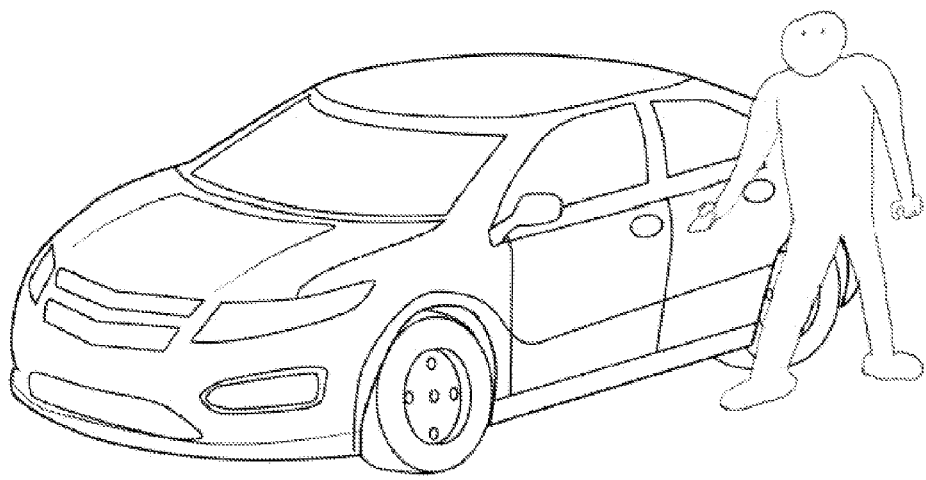
FIG. 1—a drawing showing how the device is used to test an automobile for concealed items FIG. 2—an outline of a mobile device and it's list of components used by this invention FIG. 3—a flowchart showing the process for obtaining Normal Frequencies of Vibration FIG. 4—a flowchart that shows the basic operation of the invention FIG. 5—a flowchart showing the decision process while testing the automobile for concealed items

Solid surfaces, including surfaces of metal, vibrate with a frequency of vibration when energy is applied to that surface, such as a tap or strike with another solid object. The following mathematical formula shows how the exact frequency of vibration, fn, is determined, the formula uses the number value K, the elastic constant, and the mass of the object, M, to determine the exact frequency of vibration. When K stays the same for the particular surface but mass M changes, the frequency of vibration also changes. Thus changes in mass of an object also cause changes in the frequency of vibration of that particular object. This is the basis of this invention and how it is used to determine if there are concealed materials within an object, when the object is an automobile.

$$f_n = \frac{1}{2\pi}\sqrt{\frac{K}{M}}$$

By applying energy to the surface of an automobile, and causing that surface to vibrate, then measuring the frequency of vibration, and then comparing that frequency of vibration to the known frequency of vibration for that automobile when the automobile is empty of concealed items, it can be determined if there are concealed items within the automobile. Most automobiles contain hollow cavities where items can be hidden, such as the hollow cavity between the outside surface of an automobile door and the inside surface of that automobile door, hidden items in this hollow cavity affect the mass M of the surface of the door, causing it to vibrate with a different frequency than when that hollow cavity is empty. The same process can be applied to other parts of the automobile. Also, when a significant object of a certain size is contained anywhere within the automobile, it will affect the frequency of vibration of all surfaces of the automobile. This is the basis of this Device and how it uses vibration to determine if there are hidden materials within an automobile.

Many mobile devices provide all of the components needed to implement this invention. The components are listed here. A computer processor chip and computer memory chips. An accelerometer electronic hardware component. An electronic vibrator hardware component, including speakers. A touch screen interface. A computer operating system. A computer database. A global positioning system (GPS) or GLONASS sensor. Electronic components that connect to the internet through cellular communications network. Electronic components that connect to the internet through a wireless internet router, or Wifi. A custom software application that allows the user of the Mobile Device to examine an automobile and determine if there are concealed items within the automobile by comparing the vibration value of the surface of an automobile, the test frequency, to the known vibration value, the baseline frequency, of an automobile free of contraband and hidden materials.

The mobile device contains a computer processor chip and computer memory chips that allow for software to operate on the device and manage all of the components of the device. The Mobile Device has a computer operating system software installed on it that provides for many features on the device, including the management of the components of the device, making device calls, sending text messages, allowing for users to interact with the operating system using a touch screen interface, the Graphical User Interface (GUI), and allows for the running of custom software applications that are written using a programming language such as Java, Objective C, Swift, C#, C++, and/or C.

The Mobile Device contains an accelerometer, an electronic sensor that measures vibration. This electronic component can be accessed using software. The rate of vibration measured by the accelerometer can be read by the software and stored in a variable to be used within the software, and also stored in a database on the Mobile Device. Most Mobile Devices contain an accelerometer.

The Mobile Device contains an electronic vibrator that causes the Mobile Device to vibrate. Most Mobile Devices contain an electronic vibrator specifically for vibrating the device. Normally this is used to put the Mobile Device in a "silent" mode so that the device does not make a noise when receiving an incoming call or incoming text message, instead the device vibrates. Also many software games for Mobile Devices use the electronic vibrator This electronic component can be accessed and controlled using software. It can be used to apply energy to the surface of an automobile and cause the surface of the automobile to vibrate. For those tablet computer devices that do not have an electronic vibrator specifically to vibrate the device, those devices instead can use the sound speaker built-in to the device to cause the device to vibrate.

The Mobile Device contains a touch screen interface which allows the user to interact and control the Mobile Device.

The Mobile Device contains a database library, which allows for the creation of computer databases which are accessed and controlled using the Structured Query Language (SQL) computer language.

Most Mobile Devices also contain a sensor that can determine the Latitude and Longitude location of the Mobile Device using the GPS or GLONASS Satellite network. Data from this GPS or GLONASS sensor can be accessed using software. Also this invention could also work with Mobile Devices that do not have GPS or GLONASS to get the Latitude and Longitude location of the device, those devices can instead get their location from the connection to the internet using the Google Maps system, which identifies the location of the device by way of the known location of internet routers and cellular network towers near the device.

Figure 2:

Many Mobile Device contains components that allow it to connect to the internet through the cellular communications network that handles device calls and text messages coming from and going to an Mobile Device. For Mobile Devices that do not have cellular network connectivity, that feature can be added to the device through the use of attachments that connect to the cellular network and plug in to the USB port of the device, so called "Dongles". Many Mobile Devices can also connect to the internet through a wireless internet router where such a router is available and within proximity of the Mobile Device. This is often referred to as WiFi. Data can be sent and retrieved from the internet using software. The list of components of this invention are summarized in FIG. 2 of the drawings, along with the outline of a particular Mobile Device, The Motorola Droid Smartphone.

Before this Device can be used to determine if hidden materials are contained within an automobile, a database must be built that contains the vibration values of empty automobiles to be used as the Baseline Frequencies of Vibration for comparisons. A part of this invention allows for this task to be done.

The vibration frequency measurement of an automobile empty of concealed items not normally a part of the automobile is called the Baseline Frequency. A Baseline Frequency applies to a type of automobile and part of the automobile. The Baseline Frequency can be the empty vehicle vibration frequency measurement for an automobile door. The baseline frequencies are stored in the Mobile Device computer database and also optionally on a server computer that can be accessed through the Mobile Device network connection, if available.

The data used by this invention and stored in the Mobile Device database consists of the following at a minimum:
BASELINEFREQUENCY data
Fields:
MANUFACTURER, a text field containing the name of the automobile Manufacturer/Make (optional)
MODEL, a text field containing the model of a car (optional)
TYPE, a text field containing the type of automobile (car, sport utility vehicle, van, or truck)
PART, a text field containing the auto part (door, bumper, quarter panel, trunk, fuel tank, dashboard)
BASELINEFREQUENCY, a real field that stores a floating point number, for the frequency of vibration.
ASSIGNMENTINFO data
Fields:
KEYID, a randomly generated string of data used to be the unique identifier of a single device
VARIANCE data
Fields:
VARIANCE, a number to be used as the natural variance of vibration values
TESTS data
Fields:
DATETIME, text field, the data and time of the test of the automobile
LATITUDE, number, latitude location of the device during auto test
LONGITUDE, number, longitude location of the device during auto test
MANUFACTURER, text field, the manufacturer/make of the automobile being tested (optional)
MODEL, text field, the model of the automobile being tested
COLOR, text field, the color of the automobile being tested (optional)
TYPE, text field, the type of automobile being tested (car, sport utility vehicle, etc.)
PART, text field, the part of automobile being tested (bumper, door, etc.)
TESTFREQUENCY, number, the average vibration of the auto surface during the test
PASSFAIL, text field, the results of the test of the auto, either PASS or FAIL.

Figure 3:
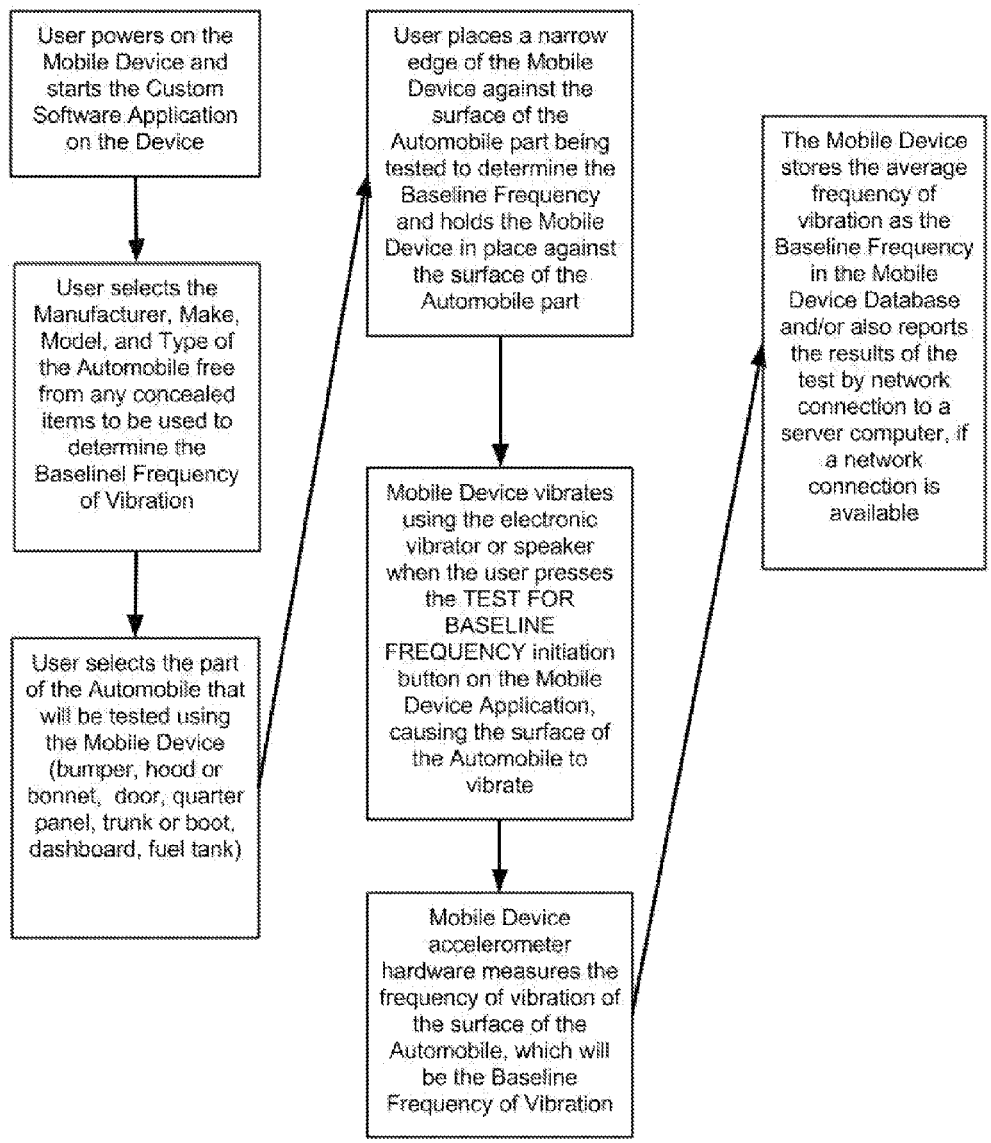

Before this invention can be effectively used, a database of the known Baseline Frequencies of Vibration for automobiles that are free of concealed items not normally a part of the automobile, must be built. This invention also provides the means to do this task in a similar fashion to testing for concealed items. It consists of the following steps which are summarized in a flowchart in FIG. 3 of the drawings:

(1) Power on the Mobile Device and start the custom software application on the device.
(2) In the first screen of the software application, the user selects the Manufacturer/Make of the automobile from a user interface control, then clicks the continue button to go to the next screen. The manufacturer chosen is stored in the Mobile Device database.
(3) The next screen of the custom software application, the users selects the type of the automobile being tested, such as 2 door car, 4 door car, truck, sport utility vehicle, etc. The users selection is stored in the Mobile Device Database.
(4) The next screen of the custom software application, the user selects the part of the automobile being tested. Parts such as quarter panel, bumper, door, boot, trunk, bonnet, dashboard, and fuel tank. The users selection is stored in the Mobile Device database.
(5) The user is now at the screen of the custom software application where the automobile will be tested to get the Baseline Frequency of Vibration. When this screen is opened, the accelerometer is initialized and ready to begin measuring vibration. On this screen of the application is a button titled INITIATE TEST FOR BASELINE FREQUENCY or similar words the user can understand. The user then takes the device and places a narrow edge against the surface of the automobile part being tested and holds the Mobile Device against the surface of the automobile. The user then clicks the button titled INITIATE TEST FOR BASELINE FREQUENCY on this screen. The Mobile Device then begins vibrating by way of its electronic vibrator hardware, or by way of its sound speaker, while the device is vibrating, the average vibration value is is measured by the accelerometer hardware and stored as the Baseline Frequency of Vibration, The user can stop holding the Mobile Device against the automobile surface once it stops vibrating.

(6) The custom software application stores the results of the test, including the Baseline Frequency of Vibration, in the device database and/or optionally also reports the results of the test and the data involved with the test to a server computer through the network connection, if a network connection is available. The server computer can then make the data available to other Mobile Devices for use in testing automobiles for concealed items.

Figure 4:
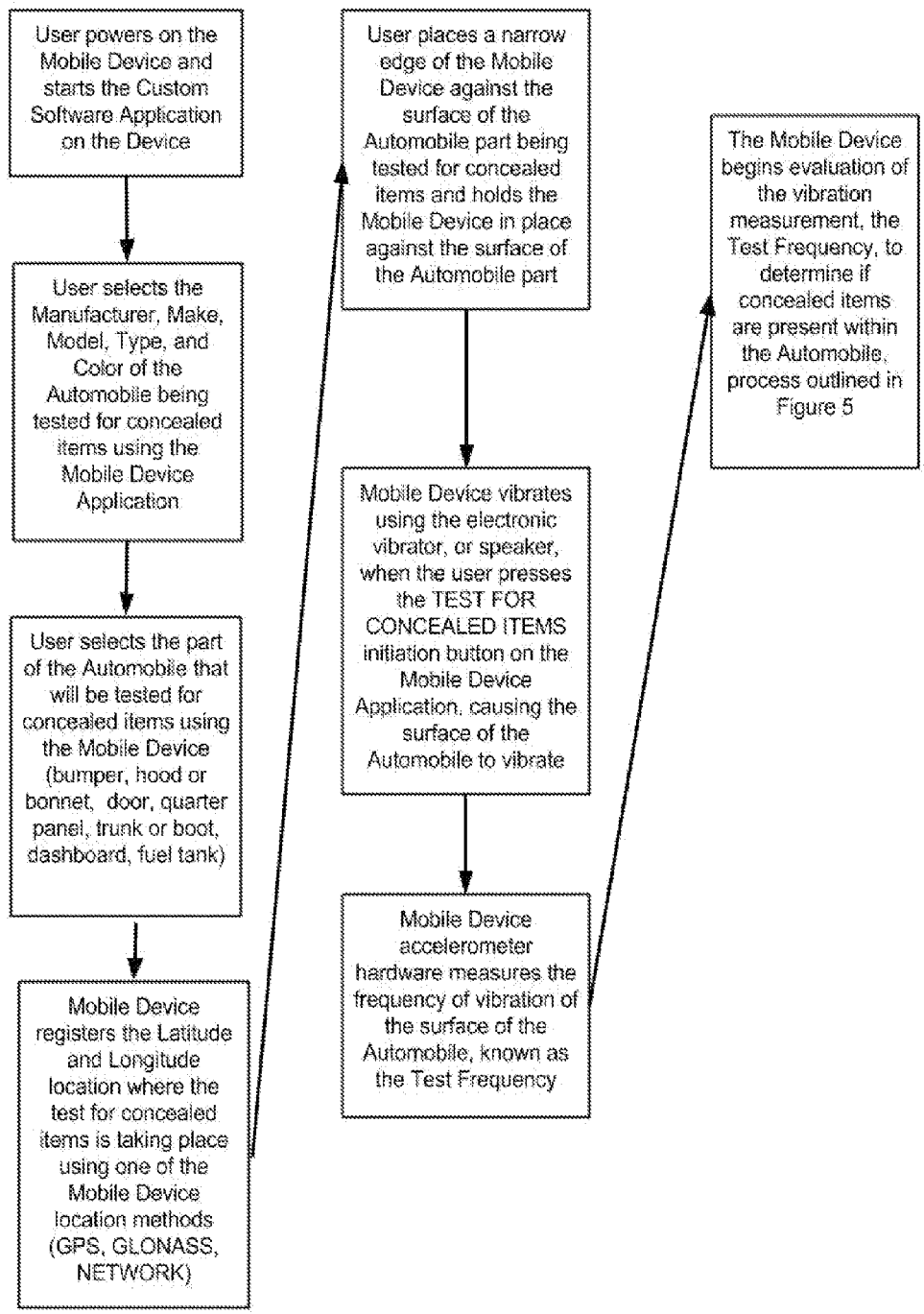
Figure 5:
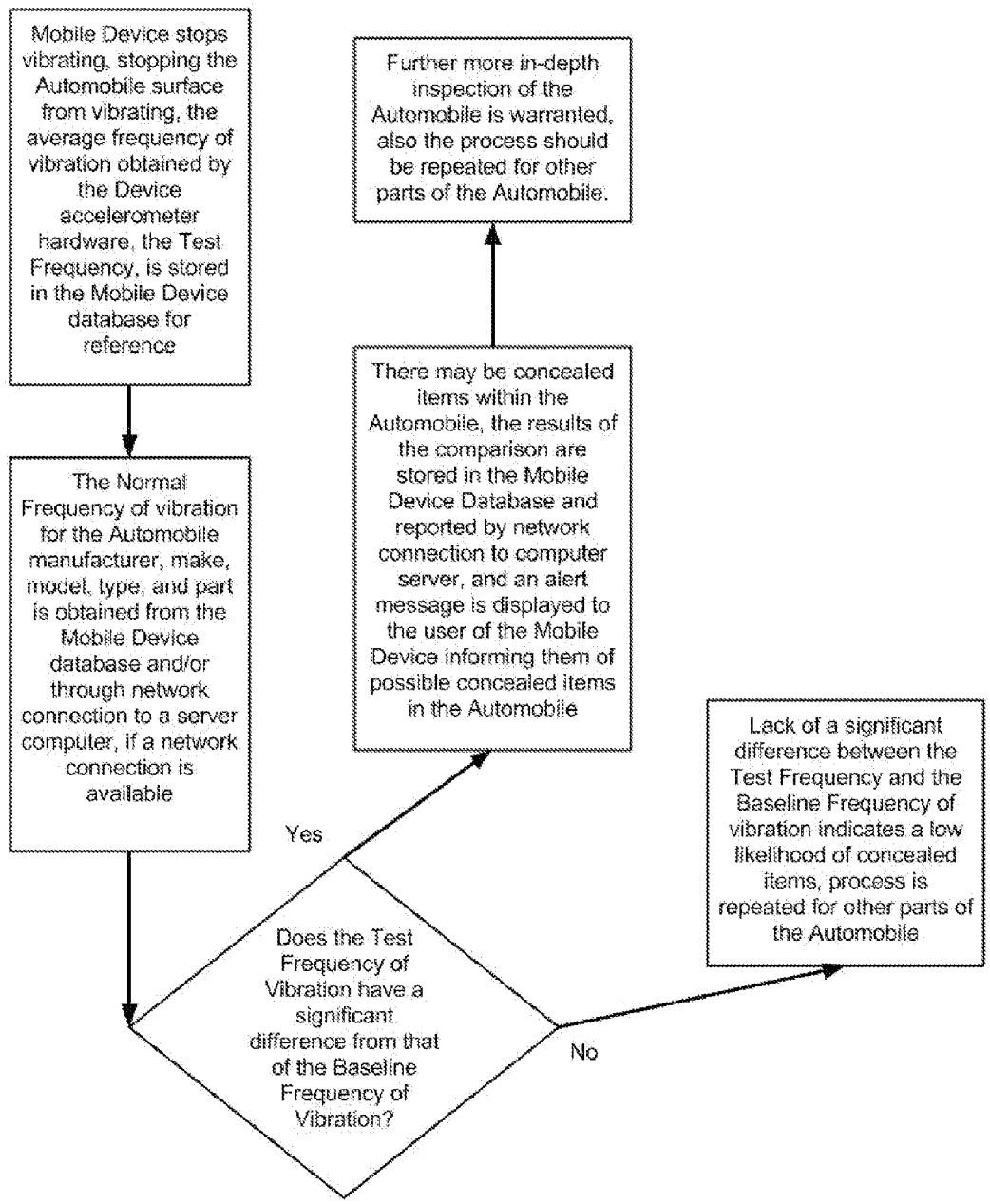

The detailed process using this invention to do a test of an automobile for the presence of concealed items is similar, composed of the following steps, which are summarized in flowcharts in FIG. 4 and FIG. 5 of the drawings:

(1) Power on the Mobile Device and start the custom software application on the device.

(2) In the first screen of the software application, the user selects the Manufacturer/Make of the automobile from a user interface control, then clicks the continue button to go to the next screen. The manufacturer chosen is stored in the Mobile Device database.

(3) The next screen of the custom software application, the user selects the Color of the automobile, then clicks the continue button to go to the next screen. The color chosen is stored in the Mobile Device database.

(4) The next screen of the custom software application, the users selects the type of the automobile being tested, such as 2 door car, 4 door car, truck, sport utility vehicle, etc. The users selection is stored in the Mobile Device Database.

(5) The next screen of the custom software application, the user selects the part of the automobile being tested. Parts such as quarter panel, bumper, door, boot, trunk, bonnet, dashboard, and fuel tank. The users selection is stored in the Mobile Device Database.

(6) The user is now at the screen of the custom software application where the actual test of the automobile will take place. When this screen is opened, the location sensor (GPS, GLONASS, NETWORK) is initialized and registers the latitude and longitude location of the device and where the automobile test is taking place. The accelerometer is also initialized and ready to begin measuring vibration. On this screen of the application is a button titled INITIATE TEST FOR CONCEALED ITEMS, or similar words the user can understand. The user then takes the device and places a narrow edge against the surface of the automobile part being tested and holds the Mobile Device against the surface of the automobile. The user then clicks the button titled INITIATE TEST FOR CONCEALED ITEMS on this screen. The Mobile Device then begins vibrating by way of its electronic vibrator hardware, or by way of sound speaker. While the device is vibrating, the average vibration value is measured by the accelerometer hardware and stored as the Test Frequency of Vibration, The user can stop holding the Mobile Device against the automobile surface once it stops vibrating.

(7) The custom software application compares the Test Frequency of Vibration to the Baseline Frequency of Vibration for that type and part of automobile, stored in the Mobile Device database, or available from a server computer through network connection, taking into account the variance of vibrations, if a significant difference exists between the two, that may indicate the presence of concealed items in the automobile. A small amount of concealed material of say only 1 or 2 kilograms (2.2 or 4.4 pounds) may not affect the Test Frequency of Vibration, but a large amount of concealed materials, say 25 to 50 kilograms (55 pounds to 110 pounds) will have a significant affect on the Test Frequency of Vibration of the surface of the automobile, since Mass affects the frequency of vibration, so much so that it will be noticeably different than the Baseline Frequency of Vibration for when an automobile is free of concealed items not normally a part of the automobile. The Mobile Device accelerometer hardware provides the means to determine the frequency of vibration. The Mobile Device electronic vibrator, or sound speaker, provides the means to apply energy to the surface of the automobile causing that surface to vibrate.

(8) The custom software application stores the results of the test in the device database and/or also optionally reports the results of the test to a server computer through the network connection, if a network connection is available. This invention is designed to have its own database of Baseline Frequency values so that it can operate in the event that there is no network connection through the cellular network or through a wireless router, "WiFi".

OTHER EMBODIMENTS

The process involved with this invention could also be used with different kinds of devices that measure vibration, like a laser vibrometer, and different devices that apply energy to the surface of an automobile causing that surface to vibrate.

I claim:

1. A mobile device for detecting whether a vehicle contains a concealed item, the device comprising:
    a vibrator for applying energy to a surface of the vehicle, wherein the energy causes the surface to vibrate;
    an accelerometer that measures a test frequency of vibration of the surface; and
    a means for comparing the test frequency of vibration to a baseline frequency of vibration for an identical surface of a vehicle of a same make, model and type that is empty of concealed items,
wherein a difference between the test frequency of vibration and the baseline frequency of vibration indicates the presence of a concealed item within the vehicle.

2. The mobile device of claim 1, wherein the mobile device is a mobile phone or a mobile tablet computer.

3. The device of claim 1, further comprising software for comparing the test frequency of vibration of the surface of the vehicle with the baseline frequency of vibration of said surface held in a database determining whether the test frequency of vibration is different from the baseline frequency of vibration, and indicating the result to the user.

4. A method for detecting an item concealed within a vehicle using a mobile device, the method comprising the steps of:
    the mobile device applying energy to a surface of the vehicle, causing the surface to vibrate;
    the mobile device measuring a test frequency of vibration of the surface; and
    the mobile device comparing the test frequency of vibration to a baseline frequency of vibration for an identical surface of a vehicle of a same make, model, and type that is empty of concealed items,
wherein a difference between the test frequency of vibration and the baseline frequency of vibration indicates the presence of a concealed item within the vehicle.

5. The method of claim 4, wherein the mobile device is a mobile phone or a mobile tablet computer.

6. The method of claim 5, wherein the mobile device uses a computer operating system.

7. The method of claim 4, wherein the vehicle is an automobile.

8. The method of claim 4, wherein the surface is a surface of vehicle part selected from the group consisting of a quarter panel, a bumper, a door, a trunk, a hood, a dashboard, and a fuel tank.

9. The method of claim 4, wherein the baseline frequency of vibration is recorded in a database, classified according to vehicle make, model, type, and part.

10. The method of claim 9, wherein the database is stored on the mobile device.

11. The method of claim 4, wherein a result of the difference between the test frequency of vibration and the baseline frequency of vibration is reported to a user of the mobile device.

12. The method of claim 11, wherein the result includes a latitude and a longitude location of the vehicle.

\* \* \* \* \*